May 31, 1927.
W. A. PITT
1,630,310
ANTIFRICTION BEARING
Filed May 16, 1924
2 Sheets-Sheet 1
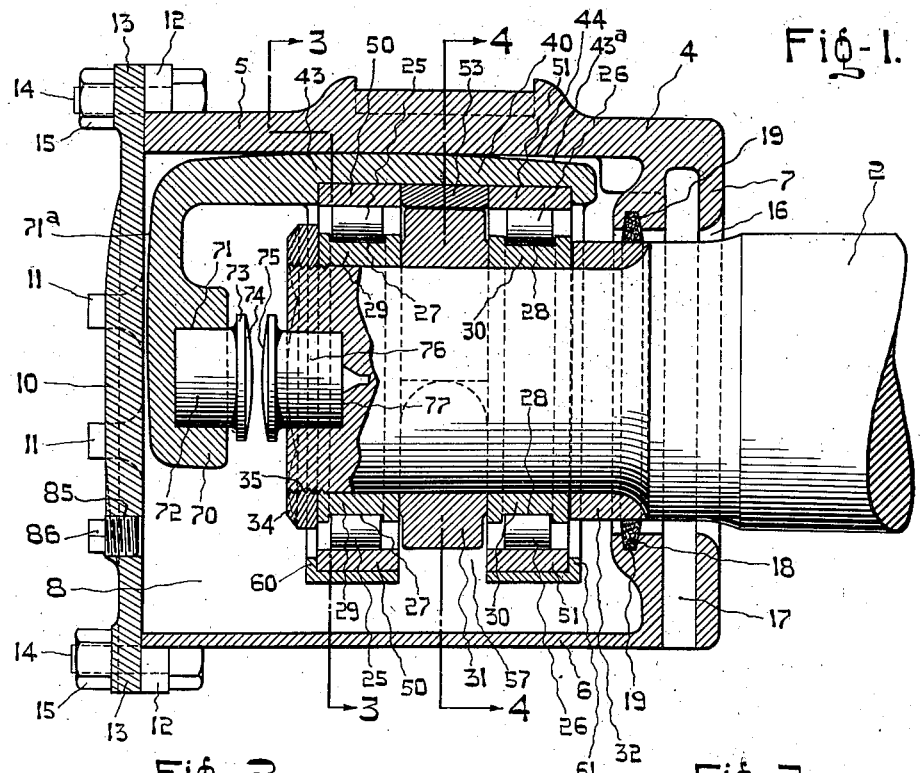
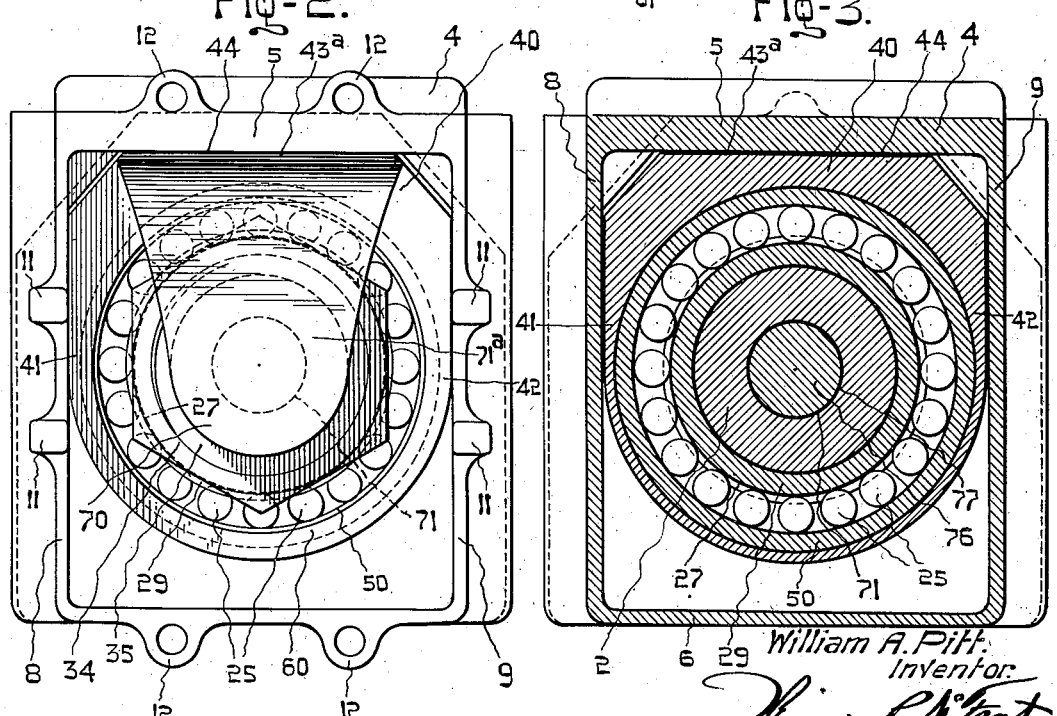
William A. Pitt,
Inventor.
Attorney.

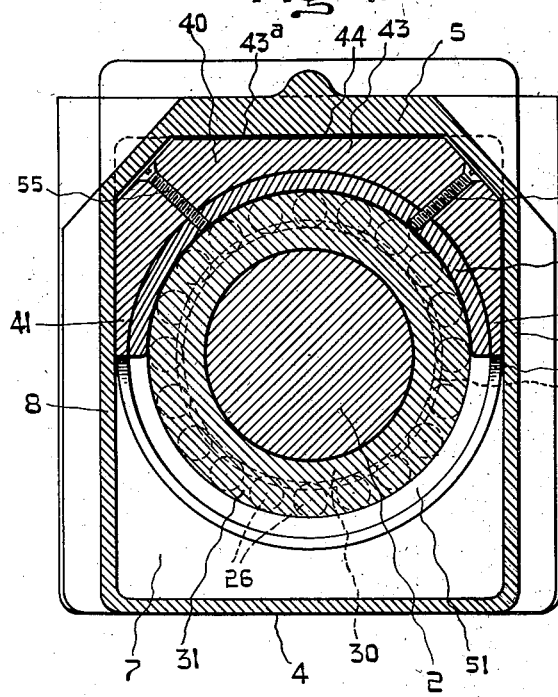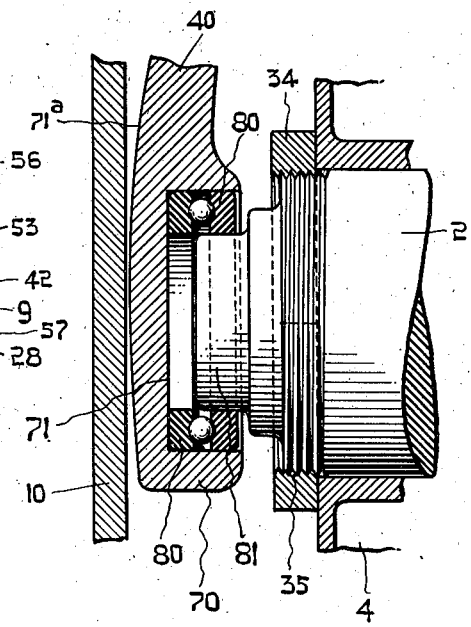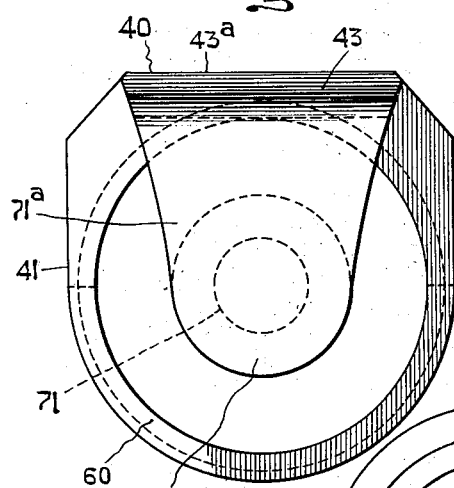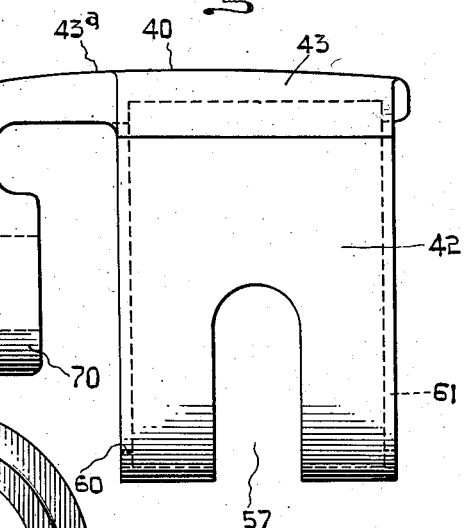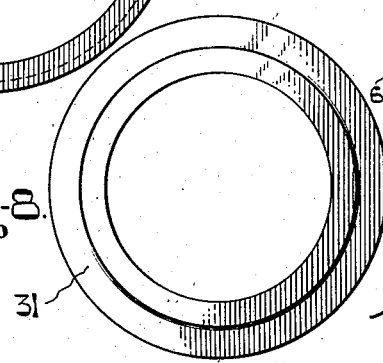

Patented May 31, 1927.

1,630,310

UNITED STATES PATENT OFFICE.

WILLIAM A. PITT, OF MONTREAL, QUEBEC, CANADA, ASSIGNOR TO GEORGE F. SHEPPARD, OF MONTREAL, CANADA.

ANTIFRICTION BEARING.

Application filed May 16, 1924. Serial No. 713,785.

My invention relates to anti-friction bearings generally, and particularly to anti friction journal bearings for railway rolling stock and the like.

Broadly stated the invention has for its object to provide an improved anti-friction bearing for use between a rotary element and a relatively stationary element, the bearing being so constructed and arranged that it will effectively perform its function notwithstanding changes in the relative positioning of the two elements.

More specifically stated the object of the invention is to provide an anti-friction bearing which when employed in journal boxes of railway rolling stock for reducing friction between the journal and its load, will automatically adjust itself to the constantly changing relative positioning of the journal and journal box.

A further object is to provide a thrust bearing which will automatically adjust itself to changes in the positioning of the journal so that the thrust will be distributed over the entire bearing irrespective of the position of the journal.

Further objects are to provide a construction which may be installed with rapidity and ease and which may be manufactured at a comparatively low cost.

To this end the invention consists of the combination, construction and particular arrangement of the parts hereinafter described and illustrated and pointed out in the claims.

For full comprehension of my invention however, reference must be had to the accompanying drawings in which similar reference characters indicate the same parts, and wherein:

Figure 1 is a part elevation and sectional view of a journal bearing constructed according to my invention;

Figure 2 is a sectional view taken on line 2—2 Figure 1, partly in elevation; the section being taken at right angles to that of Figure 1;

Figures 3 and 4 are detail views of the combined bearing member and housing for the roller bearings removed, the views being taken at right angles to each other;

Figure 5 is a detail view of the bushing adapted to act as an emergency bearing in the event of either of the anti-friction bearings breaking down; and Figure 6 is a similar view to Figure 1, of a modification.

Fig. 7 is a part elevation and sectional view of a modified form of thrust bearing.

Fig. 8 is a detail view of the emergency bearing member.

Referring to the accompanying drawings a fragment of a car axle is illustrated at 2, its journal at 3 and journal box at 4.

The latter comprises top, bottom, back and side walls 5, 6, 7, 8 and 9 respectively and a lid or cover 10 closing the front of the box which is open from side wall to side wall and from top to bottom to provide an opening large enough to permit the easy installation of the bearing members. The cover may be detachably secured in position closing this opening in any preferred manner. In the present embodiment the side walls are provided with pairs of inwardly extending hooked lugs 11 and the top and bottom walls with lugs 12, and the cover is adapted to be inserted between the hooked ends of the first mentioned lugs and secured upon the lugs 12 by bolts 14 and nuts 15.

The back wall 7 is provided with a central opening 16 for the journal, a dust guard chamber 17, the latter having a discharge outlet at its lower end to permit cinders and the like foreign objects to drop therethrough, and an annular dust guard 18, the latter consisting of a packing ring of felt or the like seated in a channel 19 surrounding the central opening adjacent its inner end.

The anti-friction bearing comprises a unit which is mounted upon the journal in position encircling the same and which is so constructed and arranged that the oscillatory and axial motion of the journal does not interfere in any way with the efficient functioning of the anti-friction devices proper. The "play" of the journal in service is untrammeled and the anti-friction devices have an even bearing under all conditions so that a uniform distribution of the load is obtained.

The unit comprises two bearings, namely a load bearing located between the journal and the top of the journal box and a thrust bearing located between the outer end of the journal and the journal box cover.

In the embodiments illustrated these two bearings are combined but it is to be distinctly understood that while the combination of the two as a unit is preferable, particularly in the construction illustrated in Figure 7, they may be constructed independently of each other without departing from the scope of this invention.

The bearing which is located between the journal and its load comprises a plurality of, preferably two, series of anti-friction rollers 25 and 26 running in raceways 27 and 28, the latter being constituted by shallow grooves in the peripheral faces of rings 29 and 30 encircling the journal. These rings are spaced apart by a combined spacing bush and emergency bearing 31 and the whole is clamped upon the journal and against an abutment presented by a third ring 32 encircling the inner end of the journal by a nut 34 screwed onto the threaded outer end 35 of the journal and constituting a collar therefor of substantially M. C. B. standard.

The outer diameter of the combined spacing and emergency bush is slightly less than the outside diameter of each series of rollers so that in the event of one of the series breaking down the emergency bearing 31 will assist in carrying the load until repairs can be made.

The foregoing construction and arrangement of the parts provides a firm mount for the rollers on the journal and makes it possible to take up any "play" between the rings when they become loose, the tightening of the nut 34 forcing the rings into tight contact with each other and with the abutment ring 32. It is obvious that the rollers will constantly follow the journal irrespective of the direction of its movement and it is therefore necessary to provide means which in turn will follow the rollers and at the same time maintain an even bearing relationship with the journal box. The means in the present embodiment which performs this function consists of what may be called an equalizing bearing member 40. This member consists of a unitary housing of substantially annular cross-section, the upper half of the annulus however being of increased thickness and presenting sides 41 and 42 and a top 43 which when viewed in front elevation are straight and conform to the shape of the journal box.

The top 43 presents a convex bearing face 43$^a$ the area of which is approximately equal to that of the bearing face 44 constituted by the underside of the top of the journal box, the curve of the convexity being described on a comparatively wide radius so that the maximum lateral shift of the contacting portions of these two bearing faces will be approximately a quarter of an inch. The inside diameter of the housing is sufficiently large to accommodate a pair of rings 50 and 51 mounted in positions encircling the rollers and in intimate contact therewith. These rings are spaced apart by a semi-circular spacing collar 53 encircling the upper half of the spacing bush 31 and rigidly secured to the housing by screws 55 and 56. In order to facilitate the assembly of these last mentioned rings within the housing the latter is provided with a semi-circular opening 57 in the middle of its lower half and outward displacement of the rings from the housing is prevented by inwardly extending flanges 60 and 61 at opposite ends of the housing.

The top 43, which is of increased thickness, is extended outwardly to within close proximity of the cover 10 and downwardly in juxta-position therewith to a point below the axial line of the journal and its downwardly extending portion is of increased thickness as at 70 and has a socket 71 into which is pressed a stud 72. The centre line of this plug coincides with the axial line of the journal and projects inwardly towards the journal, and its inner end terminates in a head 73 having a convex bearing face 74. This bearing face is adapted to engage the convex bearing face 75 presented by a similar stud 76 pressed into a socket 77 in the journal. The bearing thus formed is adapted to take up the end thrust of the journal and it will be noted that notwithstanding changes in the position of the journal the two elements of this end thrust bearing will always be in axial alignment with each other. This is particularly important when an anti friction end thrust bearing such as indicated in Figure 7 is employed because the anti-friction bearing members 80 will always be in axial alignment with the axial projection 81 on the journal so that all danger of jamming of the parts is eliminated and an even distribution of the thrust assured.

The bottom of the journal box is flat to provide ample accommodation for the lubricant which is introduced through an opening 85 in the cover closed by a removable plug 86.

When in service the relative rocking motion of the journal and the journal box does not disturb the intimate bearing relationship of any of the elements constituting either the radial load bearing or the end thrust bearing, as the convex bearing surface 43$^a$ rolls or rocks against the journal box and while maintaining a uniform contact therewith permits the outer bearing rings to follow the rollers. Not only does this construction and arrangement of parts secure an even distribution of the load under all conditions but in addition it has the advantage of facilitating the initial installation and any subsequent repair work.

The entire bearing may be easily removed by jacking up the journal box until the journal is relieved of its load, removing the cover and withdrawing the combined equalizer housing and end thrust bearing carrier. This is free to be withdrawn in an axial direction. The roller bearings may then be removed by taking off the nut 34. The installation of the various parts is accomplished in the reverse order.

What I claim is as follows:—

1. The combination of a journal box having a top portion the underside of which has a flat bearing face, a journal extending into the journal box, an anti-friction bearing unit encircling the journal and fixed against axial movement relatively thereto but movable axially in unison therewith, a substantially cylindrical housing encircling and in bearing relation with the anti-friction bearing unit and having an external top bearing surface convex in axial section and flat in transverse section and in bearing relation with the flat bearing face of the journal box, said housing being internally recessed and having rings within the recess constituting outer raceways for the anti-friction bearing unit, and the housing and rings presenting an interior free from obstruction to axial movement of the anti-friction bearing unit and journal substantially as described, and an anti-friction thrust bearing carried by the front end of the housing in axial alignment with the journal, said end thrust being constructed and arranged to permit a limited axial travel of the journal and its anti-friction bearing unit relatively to the housing before taking up the end thrust.

2. In a journal box, a journal having a peripheral bearing surface of uniform diameter and being threaded adjacent its outer end; an anti-friction bearing encircling the journal, said bearing consisting of a pair of spaced rings each having a groove in its peripheral face constituting a raceway, and a series of anti-friction devices adapted to run in each groove, an emergency bearing spacing the rings apart and consisting of a ring of solid cross-section encircling the journal, said emergency bearing being normally inactive as a load bearing member, and means for securing the anti-friction bearing in position on the journal, said last mentioned means consisting of a nut screwed upon the said threaded portion of the journal and constituting a journal collar of substantially M. C. B. standard, and an annular member encircling the anti-friction bearing having a convex top load bearing surface for engagement with the journal box.

3. In a journal box, a journal, an anti-friction bearing encircling the journal, means for securing the bearing in position upon the journal, equalizing bearing means encircling the anti-friction bearing and consisting of an annular housing having an external convex top constituting a broad bearing surface, rings located within the housing and encircling the anti-friction bearing, said housing having its ends inwardly flanged to prevent outward axial displacement of the rings, and having a transverse semi-circular opening midway its length adapted to permit the insertion of the rings within the housing, and a semi-circular member inserted within the housing and spacing the said rings apart, and means securing the semi-circular member in fixed position in the housing.

4. In a journal box, a journal, an anti-friction bearing encircling the journal, said bearing consisting of a pair of spaced rings each having a groove in its peripheral face constituting a raceway, and a series of anti-friction devices adapted to run in each groove, an emergency bearing spacing the rings apart and consisting of a ring of solid cross-section encircling the journal, said emergency bearing being normally inactive as a load bearing member, means for securing the bearing in position upon the journal, equalizing bearing means encircling the anti-friction bearing and consisting of an annular housing having an external convex top constituting a load bearing surface, rings located within the housing and encircling the anti-friction bearing, said housing having its ends inwardly flanged to prevent outward axial displacement of the rings and having a transverse semi-circular opening midway its length adapted to permit the insertion of the rings within the housing, and a semi-circular member inserted within the housing and spacing the said rings apart, and means securing the semi-circular member in fixed position in the housing.

5. The combination of a journal box having a top portion the underside of which has a flat bearing face, a journal extending into the journal box, an anti-friction bearing unit encircling the journal, means for securing the anti-friction bearing upon the journal, a substantially cylindrical bearing member encircling the anti-friction bearing unit and having a top portion extending outwardly beyond the outer end of the journal and having the outer end of said portion extended downwardly below the axial line of the journal, said top portion having an external convex bearing face in bearing relation with the said flat bearing face of the journal box, and a thrust bearing consisting of an anti-friction bearing carried by the outer end of the housing and an axial extension on the outer end of the journal adapted to at times bear against said bearing.

In testimony whereof I have signed my name to this specification.

WILLIAM A. PITT.